Patented Jan. 25, 1944

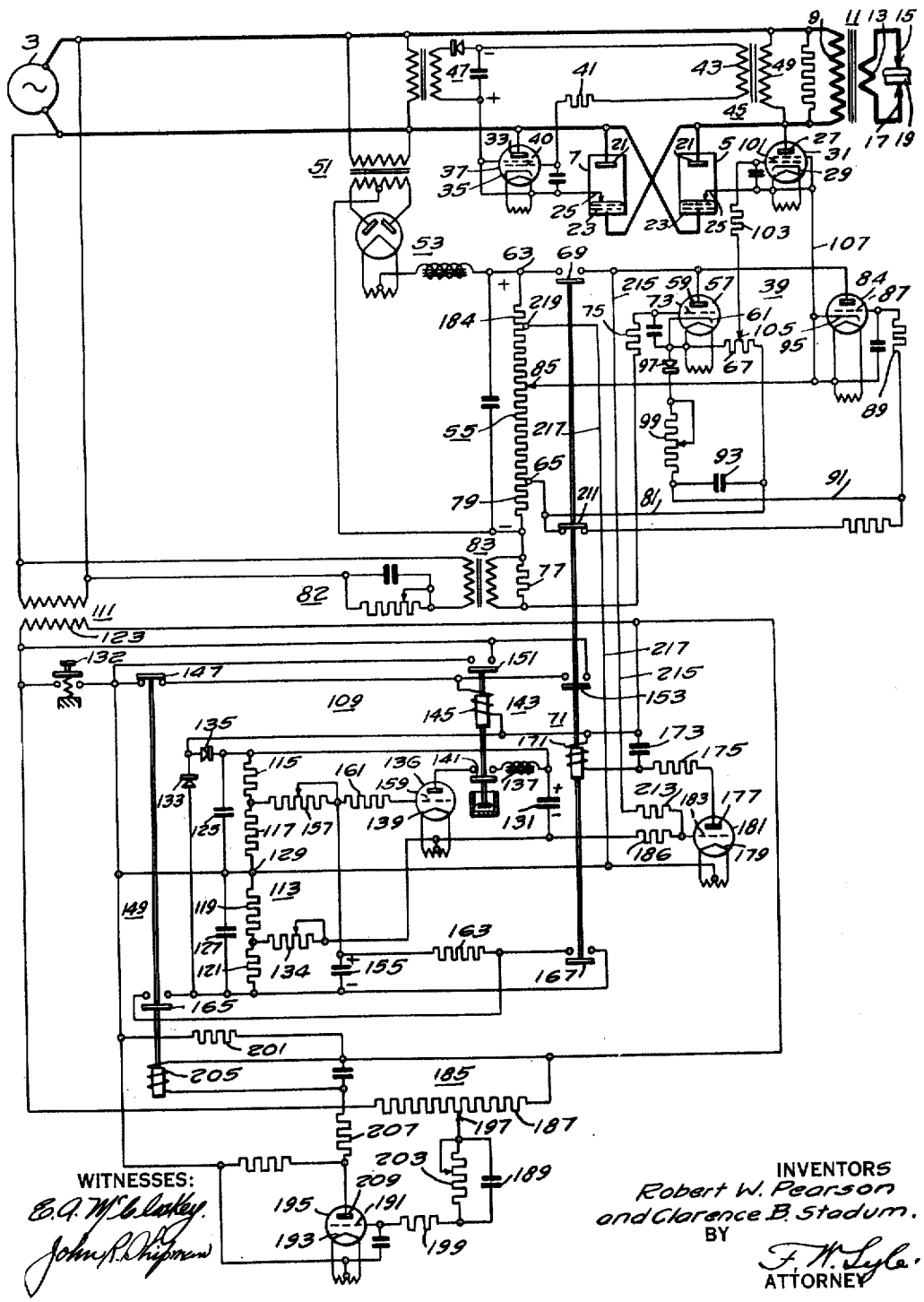

2,340,077

UNITED STATES PATENT OFFICE 2,340,077

ELECTRIC DISCHARGE APPARATUS

Robert W. Pearson and Clarence B. Stadum, Wilkinsburg, Pa., assignors to Westinghouse Electric & Manufacturing Company, East Pittsburgh, Pa., a corporation of Pennsylvania Application May 14, 1942, Serial No. 442,940

7 Claims. (Cl. 250—27)

This invention relates to electric discharge apparatus and has particular relation to an electronic control system for welding apparatus.

In resistance spot welding, highly uniform welds of good quality may be obtained by a method which is known as pulsation or interrupted spot welding. A predetermined number of discrete impulses of current is supplied to the materials to be welded to produce each weld. Each impulse is of a predetermined length and there is a predetermined time interval between successive impulses. Since the welding apparatus is employed in welding a number of different materials having varying dimensions and properties, it is necessary that the control system be adjustable over a wide range to vary the length of the impulses as well as the length of the intervals between successive impulses.

A pulsation welding apparatus is shown in a copending application of Robert W. Pearson and S. J. Murcek, Serial No. 412,660, filed September 27, 1941, and assigned to the Westinghouse Electric & Manufacturing Company. In this apparatus, current is supplied from an alternating source through a pair of inversely connected ignitrons to the welding transformer. A contactor of a relay is arranged in the firing circuits of the ignitrons in such a manner that welding current flows only in the half periods in which the relay is energized. A timing system is provided which energizes the relay for a predetermined interval of time and then deenergizes it for another predetermined interval of time. The timing system continues to repeat this energization and deenergization for a preselected period of time.

The apparatus described in the copending Pearson and Murcek application is entirely satisfactory for many purposes. However, it is impossible to determine at what point in a half period of the source the relay will be initially energized. It is therefore, impossible to maintain the current-time product exactly constant which is desirable in certain welding operations.

An interrupted spot welder whose operation is synchronized with the alternating current of the source is described in the copending application of Finn H. Gulliksen, Serial No. 271,951, filed May 5, 1939, Patent No. 2,303,453, December 1, 1942. In the Gulliksen apparatus the welding current is always initiated at the same instant in a half period so that the current-time product remains constant. However, a considerable number of electric discharge devices and other equipment is employed which increases the manufacturing cost and renders the operation more complex.

It is accordingly an object of our invention to provide an interrupted spot welder synchronized with the source and having a simplified construction and operation.

Another object of our invention is to provide a new and improved timing system for an interrupted spot welder which operates in synchronism with the alternating potential source.

A more general object of our invention is to provide a novel system for supplying power from a periodically pulsating source to a load in discrete impulses, each impulse being of a predetermined length as measured in terms of periods of the source with a predetermined time interval between successive impulses.

More specifically, it is an object of our invention to provide an improved spot welding system for synchronous operation from an alternating-current source which employs a minimum number of electric discharge valves and control circuits.

In accordance with our invention, current is supplied from a source to the welding transformer through a pair of ignitrons connected in anti-parallel. Firing of the ignitrons is controlled by a synchronous on-time timing system which includes a start valve and a stop valve. The on-time timing system is conditioned for operation by the energization of a control relay. An auxiliary alternating-current circuit is arranged to energize the control relay as long as an electric discharge control valve in the auxiliary circuit is rendered conductive in each positive half period. The control valve is originally maintained non-conductive by the potential appearing across a first capacitor in the control circuit thereof.

To initiate a welding operation, the first capacitor is discharged, rendering the control valve conductive. The control relay is immediately energized and conditions the on-time timing system for operation. Energization of the relay also causes a biasing potential to be impressed in the control circuit of the control valve. This biasing potential is effective to render the valve conductive in successive positive half periods of the source regardless of the potential of the first capacitor.

The start valve is rendered conductive at the beginning of the next positive half period of the alternating current after the control relay is energized. When the start valve becomes conductive, welding current flows through the ignitrons and is supplied to the welding transformer continuously for a predetermined time interval. At the expiration of the predetermined interval, the stop valve is rendered conductive. When the stop valve becomes conductive, the biasing potential in the control circuit of the control valve is greatly reduced. In the meantime, the first capacitor has been recharged so that when the biasing potential is reduced, the capacitor potential is sufficient to maintain the control valve non-conductive.

The control relay is deenergized when the control valve does not become conductive in successive positive half periods. A predetermined time after the control relay is deenergized, the first capacitor is again discharged to render the control valve conductive and another current impulse is supplied to the welding transformer. After a predetermined number of current impulses have been so supplied, an overall timing system becomes effective to prevent further energization of the control relay.

The novel features that we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawing, the single figure of which is a diagrammatic view illustrating an embodiment of our invention.

As illustrated in the drawing, current is supplied from a source of alternating current 3 through a pair of ignitrons 5 and 7 connected in anti-parallel to the primary 9 of the welding transformer 11. The secondary 13 of the welding transformer is connected across the electrodes 15 and 17 in engagement with the material 19 to be welded. Each of the ignitrons includes an anode 21, a mercury pool cathode 23 and an igniter 25 in contact with the cathode. The ignition circuit of one of the ignitrons 5 may be traced from one side of the source 3 through the primary 9 of the transformer 11, the anode 27 and cathode 29 of an electric discharge valve 31 to the igniter 25 and cathode 23 of the ignitron 5, to the other side of the source 3. The ignition circuit of the other ignitron 7 may be similarly traced through the anode 33 and cathode 35 of another electric discharge valve 37. The electric discharge valves 31 and 37 in the ignition circuits of the ignitrons 5 and 7 are of the arc-like type and are hereinafter designated as the firing tubes.

Conductivity of the firing tube 31 for the first ignitron 5 is controlled by an on-time timing system 39. The control circuit of the firing tube 37 for the second ignitron 7 may be traced from the grid 40 through a grid resistor 41, the secondary 43 of an auxiliary transformer 45, a biasing potential source 47, to the cathode 35. The primary 49 of the auxiliary transformer 45 is connected directly across the primary 9 of the welding transformer. The arrangement described for control of the firing tube 37 for the second ignitron 7 is what is known as a follow-up system. The first ignitron 5 is rendered conductive initially and when it ceases to conduct, the reactance of the welding transformer primary 9 causes a potential impulse to be impressed in the control circuit of the firing tube 37 through the auxiliary transformer 45. As a result, the second ignitron 7 is rendered conductive.

The on-time timing system 39 is energized from the source 3 through an auxiliary transformer 51 and a rectifying system 53 which impresses a direct-current potential across a voltage divider 55. An electric discharge valve 57 of the arc-like type, which is hereinafter designated a start valve, is connected with its anode 59 and cathode 61 between the positive terminal 63 of the voltage divider 55 and an intermediate tap 65 near the negative end through a resistor 67 and a contactor 69 of a control relay 71.

The control circuit of the start valve 57 may be traced from the grid 73 through a grid resistor 75, a second resistor 77, the lower portion 79 of the voltage divider 55, a conductor 81 and resistor 67 to the cathode 61. The potential across the lower portion 79 of the divider tends to maintain the start valve 57 non-conductive after the contactor 69 of the relay 71 is closed. However, a potential impulse is impressed across the resistor 77 in the control circuit from the source 3 through a phase-shifting circuit 82 and an impulsing transformer 83. This potential impulse counteracts the biasing potential of the lower portion of the divider to render the start valve conductive. The phase-shifting circuit 82 is preferably so adjusted with respect to the power factor that the start valve 57 becomes conductive at the beginning of a half period of the alternating current but it may be set to render the start valve conductive at any predetermined instant in the half period.

An electric discharge valve 84 of the arc-like type, which is designated a stop valve, is connected between the positive terminal 63 of the voltage divider 55 and an intermediate tap 85 thereof through the contactor 69 of the control relay 71. The control circuit of the stop valve 84 extends from the grid 87 through a grid resistor 89, a conductor 91, a capacitor 93, to the lower intermediate tap 65 of the divider. The control circuit continues from the intermediate tap 85 to the cathode 95 of the stop valve. The capacitor 93 is also connected in series with the start valve 57 through a rectifier 97 and a potentiometer 99. Thus, when the start valve 57 becomes conductive, the capacitor 93 is charged at a rate which is determined by the setting of the potentiometer 99. The portion of the voltage divider in the control circuit of the stop valve 84 tends to maintain it non-conductive, but after a predetermined interval of time, the capacitor 93 is charged to a sufficient potential to counteract the biasing potential of the divider and render the stop valve conductive.

The control circuit of the firing tube 31 for the first ignitron 5 may be traced from the grid 101 through the grid resistor 103, an intermediate tap 105 on the resistor 67 in the start valve circuit, the lower intermediate tap 65 on the divider, another intermediate tap 85 on the divider, and conductor 107 to the cathode 29 of the firing tube. It is then apparent that when the start valve 57 is non-conductive, the grid 101 of the firing tube 31 is negative with respect to the cathode 29. However, when the start tube 57 becomes conductive, the intermediate tap 105 on the resistor 67 in series therewith and, therefore, the grid 101 of the firing tube 31 becomes positive with respect to the cathode 29. When the stop valve 84 becomes conductive, the cathode 29 of firing tube 31 is connected therethrough to the positive terminal 63 of the divider 55 and the grid 101 again is negative with respect to the cathode 29.

The operation of the control relay 71 is controlled by a timing system indicated generally at 108. Power is supplied to the system 109 from the source 3 through an auxiliary transformer 111. A voltage divider 113 having four sections 115, 117, 119 and 121 is arranged to be energized from the secondary 123 of the auxiliary transformer 111. A filter capacitor 125 is connected across the two upper sections 115 and 117 of the divider 113, and another filter capacitor 127 is connected across the two lower sections 119 and 121. The center tap 129 of the divider 113 is connected through a push button switch 132 to one side of the secondary 123. The outer terminals of the voltage divider 113 are connected through rectifiers 133 and 135 to the other side of the secondary 123. The direction of current flow through the rectifiers 133 and 135 is such that the capacitor 125 across the two upper sections of the divider is charged in one half period, and the other capacitor 127 across the two lower sections, is charged in the opposite half period. This rectifier-capacitor arrangement is a typical voltage doubler circuit which is well known in the art.

A control capacitor 131 is connected across the three upper sections 115, 117 and 119 of the divider through an adjustable resistor 134. An electric discharge device 136 of the arc-like type in series with an inductance 137, is connected directly across the control capacitor 131 with its cathode 139 connected to the negative plate of the capacitor. The circuit through the device 136 is controlled by a contactor 141 of another relay 143. The operating coil 145 of this relay 143 is energized from the secondary 123 of the auxiliary transformer 111 through normally closed contactor 147 of a relay 149 when the push button switch 132 is closed. A pair of holding circuits are connected across switch 132, one through contactor 151 of relay 143 and the other through contactor 153 of relay 71.

Another capacitor 155 is connected across the three lower sections 117, 119 and 121 of the divider through another adjustable resistor 157. The grid 159 of the discharge device 136 is connected to the positive plate of this capacitor 155 through a grid resistor 161. Thus, when the capacitor 155 is charged, the grid 159 of the device 136 is positive with respect to its cathode 139, permitting the device to be rendered conductive. However, when the capacitor 155 is discharged, the device 136 is prevented from becoming conductive by the negative potential appearing across the lower section 121 of the divider. The capacitor 155 may be discharged through a resistor 163 by the closing of a normally open contact 165 of relay 149 or by the closing of another contact 167 of the control relay 71.

The operating coil 171 of the control relay 71 is arranged to be energized from the secondary 123 of the auxiliary transformer 111. The energizing circuit may be traced from one side of the secondary 123 through a parallel circuit consisting of the operating coil 171 on one side and a capacitor 173 on the other side, a current-limiting resistor 175, the anode 177 and cathode 179 of a control electric discharge valve 181, the center tap 129 of the divider 113, and contactor 151 of relay 143 to the other side of the secondary. The control valve 181 is of the arc-like type, and its grid 183 is connected to the negative plate of the control capacitor 131.

The control circuit of the control valve 181 extends from the grid 183, through grid resistor 186, the control capacitor 131, sections 115 and 117 of divider 113 to the cathode 179. Thus, when the control capacitor 131 is charged, the grid 183 is negative with respect to the cathode 179. However, when the capacitor 131 is discharged, the grid 183 becomes positive, permitting the control valve 181 to be rendered conductive in each positive half period of the source 3. The capacitor 173 in parallel with the operating coil 171 of the control relay 71 is of such dimensions that the coil is maintained energized between successive positive half periods. It is then evident that in the absence of other influences, the control relay 71 is energized as long as the control capacitor potential remains less than the biasing potential provided by the two upper sections of the divider 113. However, the grid 183 is connected through resistor 213, conductor 215 and contactor 69 of relay 71 to the positive terminal 63 of divider 55 in the on-time timing system and the cathode 179 is connected by conductor 217 to intermediate tap 219 on divider 55. Thus, when relay 71 is first energized and closes contactor 69, the potential of portion 184 of divider 55 is placed across the grid and cathode of control valve 181 to render it conductive in successive positive half periods regardless of the potential of control capacitor 131. Then when the stop valve 84 becomes conductive, the potential between terminal 63 and tap 85 is greatly reduced so that the potential of section 184 is insufficient to maintain the control valve conductive.

An overall timing system 185 is also provided to limit the number of current impulses which may be supplied in one operation. A voltage divider 187 is connected directly across the secondary 123 of the auxiliary transformer 111. A capacitor 189 is then charged by the rectified leakage current through the grid 191 and cathode 193 of another electric discharge valve 195 of the arc-like type. The circuit for charging the capacitor 189 may be traced from the center tap 197 of the divider 187 through the capacitor 189, a grid resistor 199, the grid 191 and cathode 193 of the valve 195 and contactor 151 or the push button switch 132 to one terminal of the divider. The cathode 193 of the valve 195 is also connected to the other terminal of the divider through the small resistor 201. Thus, when the push button switch 132 and/or contactor 151 is closed, the cathode 193 of the valve 195 is connected to both sides of the voltage divider 187 and charging of the capacitor 189 is halted. The capacitor 189 then discharges through an adjustable resistor 203 in parallel therewith. The negative plate of the capacitor 189 is connected to the grid 191 of the valve 195 so that the valve remains non-conductive while the capacitor is charged. However, when the capacitor 189 becomes discharged after an interval of time determined by the setting of the resistor 203, the valve 195 is rendered conductive. Current then flows from one terminal of the voltage divider 187 through the operating coil 205 of the relay 149, a current-limiting resistor 207 to the anode of 209 of the valve 195. The circuit continues from the cathode 193 of the valve 195 through the contactor 151 to the other side of the divider. Thus, a predetermined time interval after the push button 132 is first closed, the relay 149 is energized and one of its contactors 165 maintains the capacitor 155 of the timing system 109 discharged while the other contactor 147 breaks one of the holding circuits around push button switch 132.

To initiate a welding operation, the push button switch 132 is manually closed. Voltage divider 113 is then energized, and after a time delay, the relay 143 is operated to close the circuit through the discharge device 136. During the time delay, the control capacitor 131 and the other capacitor 155 are charged. When the circuit through the device 136 is closed by the contactor 141, the device 136 immediately becomes conductive to discharge the control capacitor 131. The control capacitor 131 discharges to below the arc-drop of device 136 in a short but definite time interval, and the device 136 becomes non-conductive. Immediately thereafter, recharging of the control capacitor 131 begins. However, when the control capacitor 131 is discharged, the control valve 181 becomes conductive to conduct current in each positive half period of the source. The operating coil 171 of the control relay 71 is thus energized and maintained energized between positive half periods by capacitor 173. As the control capacitor 131 recharges, it eventually rises above the critical potential of the control valve 181. However, as the contactor 69 of the relay 71 is closed, the potential of the upper portion 184 of the divider 55 is placed across the grid 183 and cathode 179 of the control valve 181 to maintain it conductive in positive half periods of the alternating current.

After the contactor 69 of the control relay 71 is closed, the start valve 57 is rendered conductive at the beginning of the next positive half period of the alternating current by the impulse received through the phase shifting circuit 82. As a result, the firing tube 31 of the first ignitron 5 becomes conductive to render the ignitron 5 conductive. The follow-up system causes the second ignitron 7 to conduct current during the negative half period of the source. The ignitrons 5 and 7 thus conduct current in alternate half periods until the stop valve 84 becomes conductive a predetermined time later. When the stop valve 84 becomes conductive, the grid 101 of the firing tube 31 for the first ignitron 5 becomes negative and further conduction of current through the ignitron 5 is halted.

The potential impressed from the divider 55 on the control circuit of the control valve 181 is greatly reduced when the stop valve 84 becomes conductive. Since the control capacitor 131 has been recharged in the meantime, the control valve 181 no longer conducts current in each positive half period. Consequently, the relay 71 is deenergized, opening the contactor 69 in the anode circuits of the start and stop valves 57 and 83 and closing a contactor 211 in a discharge circuit of the capacitor 93.

When the control relay 71 is first energized, its lower contactor 167 closes the discharging circuit of the capacitor 155 in the control circuit of the discharge device 136. While this capacitor 155 is maintained in a discharged condition, the device 136 cannot become conductive so that recharging of the control capacitor 131 may proceed without interruption. However, when the control relay 71 is again deenergized, the discharging circuit of the capacitor 155 is opened and recharging thereof at a selected rate is initiated. Upon charging the capacitor 155 to a potential above the critical potential of the device 136, the latter is again rendered conductive to discharge the control capacitor 131 and effect energization of the relay 71 to start another cycle of operation.

When the push button switch 132 is initially closed, the precharged capacitor 189 in the overall timing system 185 begins to discharge at a predetermined rate depending upon the setting of the resistors 203 in parallel therewith. Resistor 203 is adjusted so that the capacitor potential drops to a point permitting firing of the valve 195 after a predetermined number of cycles of charging and discharging the control capacitor 131. When the valve 195 becomes conductive, the relay 149 is energized and its contactor 165 closes the discharging circuit of the capacitor 155 and maintains the capacitor 155 in a discharged condition. As a result, further operation of the timing system 109 is prevented. Energization of relay 149 also opens contactor 147 to deenergize relay 143 whose contactor 151 breaks one of the holding circuits around switch 132. The other holding circuit is completed through contactor 153 of control relay 71 so that the welding operation may not be halted in the middle of a welding impulse.

Although we have shown and described a specific embodiment of our invention, we are fully aware that many modifications thereof are possible. Our invention, therefore, is not to be restricted except insofar as is necessitated by the prior art and by the spirit of the appended claims.

We claim as our invention:

1. For use in supplying current from a source to a load, the combination comprising valve means for controlling the flow of current to the load, a first timing means effective while conditioned for operation to render said valve means conductive throughout a first preselected time interval, control means for conditioning said first timing means for operation, means for momentarily energizing said control means, means associated with said first timing means and said energizing means for maintaining said control means energized until the expiration of said first time interval, and a second timing means responsive to deenergization of said control means for initiating reoperation of said energizing means a second preselected time interval thereafter.

2. For use in supplying current from a source of periodic potential to a load, the combination comprising valve means for controlling the flow of current to the load, a first timing means effective while conditioned for operation to render said valve means conductive throughout a first preselected time interval beginning at a predetermined instant in the period of said source following a conditioning thereof, control means for conditioning said first timing means for operation, means for energizing said control means throughout a second time interval shorter than said first time interval, a second timing means responsive to deenergization of said control means for initiating reoperation of said energizing means a second preselected time interval thereafter, and means associated with said first timing means and said energizing means for maintaining said control means energized until the expiration of said first time interval.

3. For use in supplying current from a source to a load, the combination comprising valve means for controlling the flow of current to the load, a first timing means effective while conditioned for operation to render said valve means conductive throughout a first preselected time interval, control means for conditioning said first timing means for operation, a normally charged capacitor, means for momentarily discharging said capacitor, means for energizing said control means when said capacitor is discharged, means in circuit with said capacitor constantly tending to charge it, means associated with said first timing means and said energizing means for maintaining said control means energized until the expiration of said first time interval, and a second timing means responsive to deenergization of said control means for initiating reoperation of said discharging means a second preselected time interval thereafter.

4. For use in supplying current from a source of periodic potential to a load, the combination comprising valve means for controlling the flow of current to the load, a first timing means effective while conditioned for operation to render said valve means conductive throughout a first preselected time interval beginning at a predetermined instant in the period of said source following a conditioning thereof, control means for conditioning said first timing means for operation, a normally charged capacitor, means for momentarily discharging said capacitor, means for energizing said control means when said capacitor is discharged, means in circuit with said capacitor constantly tending to charge it, means associated with said first timing means and said energizing means for maintaining said control means energized until the expiration of said first time interval, and a second timing means responsive to deenergization of said control means for initiating reoperation of said discharging means a second preselected time interval thereafter.

5. For use in supplying current from a source of periodic potential to a load, the combination comprising valve means for controlling the flow of current to the load, a first timing means effective while conditioned for operation to render said valve means conductive throughout a first preselected time interval beginning at a predetermined instant in the period of said source following a conditioning thereof, control means for conditioning said first timing means for operation, a capacitor, means constantly tending to charge said capacitor, means for momentarily discharging said capacitor, potential responsive means in circuit with said capacitor for energizing said control means while said capacitor is discharged, means associated with said first timing means for impressing a potential on said potential responsive means to maintain said control means energized until the expiration of said first time interval, and a second timing means responsive to deenergization of said control means for initiating reoperation of said discharging means a second preselected time interval thereafter.

6. For use in supplying power from a source of current to a load, the combination comprising valve means for controlling the flow of current to the load, timing means for rendering said valve means conductive throughout a preselected interval of time, control means for said timing means, means including a normally charged capacitor for impressing on said control means a potential having one polarity with respect to a predetermined reference plane of potential, said control means being operable to initiate operation of said timing means when the impressed potential is changed to the opposite polarity with respect to said reference plane, means for momentarily discharging said capacitor to change the magnitude of said impressed potential and thereby change the impressed potential to said opposite polarity, means constantly tending to charge said capacitor and thereby return said impressed potential to said one polarity, a second timing means under the control of said control means for effecting reoperation of said discharging means a preselected time after the impressed potential returns to said one polarity, and means associated with said first timing means for preventing the impressed potential from returning to said one polarity until the instant of expiration of said first preselected time interval.

7. Apparatus according to claim 6 in which the preventing means comprises means for supplying an additional potential from said first timing means to said control means during said first preselected time interval, said additional potential being of such magnitude and polarity as to prevent the resultant potential impressed on said control means from returning to said one polarity.

ROBERT W. PEARSON.
CLARENCE B. STADUM.